S. D. Ely,
Journal Lubricator.
Nº 100,875.          Patented Mar. 15, 1870.
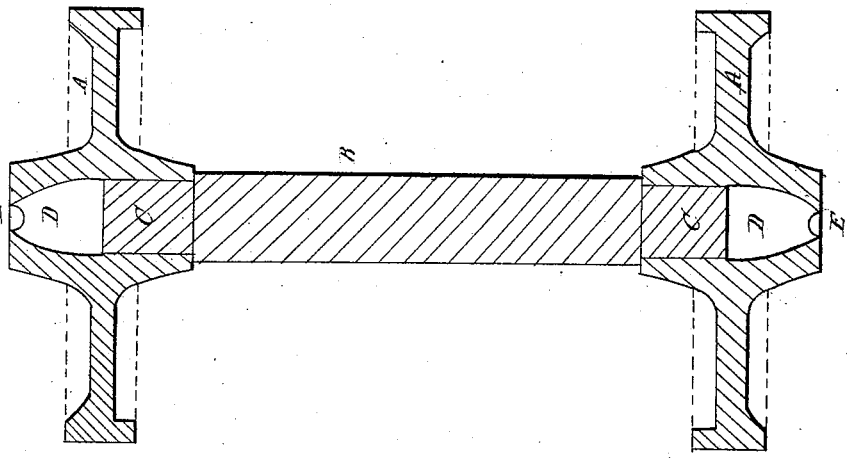
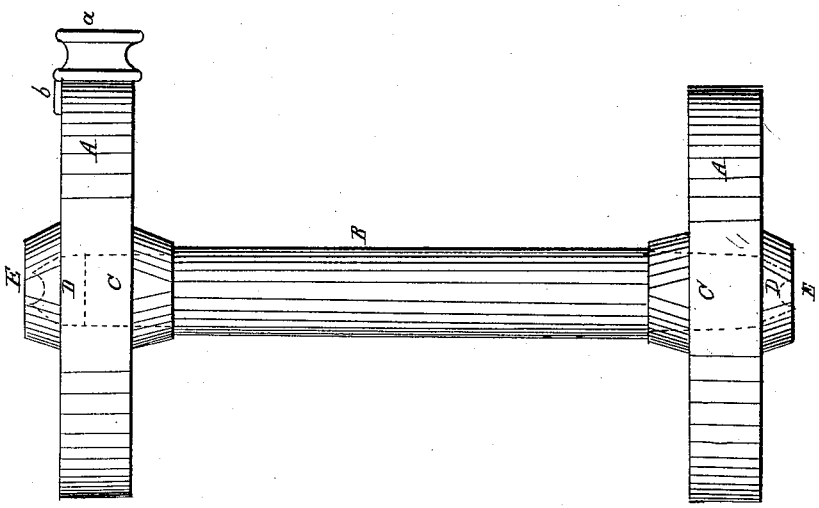
Witnesses
William Green
Peter M. Kafer
Inventor
Stephen D. Ely

United States Patent Office.

STEPHEN D. ELY, OF MILLSTONE, NEW JERSEY.

Letters Patent No. 100,875, dated March 15, 1870.

---

IMPROVEMENT IN THE MODE OF LUBRICATING THE WHEELS IN TREAD-POWERS.

---

The Schedule referred to in these Letters Patent and making part of the same.

---

*To all whom it may concern:*

Be it known that I, STEPHEN D. ELY, of the township of Millstone, in the county of Monmouth, and State of New Jersey, have invented certain new and useful Improvements in the Mode of Applying Grease to Wheels for Tread-Powers and other machinery; and I do hereby declare that the following is a full and exact description thereof, reference being had to the accompanying drawings and to the letters of reference marked thereon, which form a part of these specifications, in which —

Figure 1 represents a side view of my improvement.

Figure 2 represents a longitudinal bisection.

My invention consists in forming a conical-shaped bore or cavity within the outer extremity or hub of a wheel, so that grease of any kind, either in a hard or liquid state, may be applied at the outer end of the hub through a small opening, and, thus applied, works itself inwardly to the shoulder and bearing of the axle.

This invention is applicable to tread-powers and other machinery where wheels are not required to be fastened to to the shaft or axle, the advantage being that it only requires one-third of the grease commonly used, the power or machinery is greased in one-fifth of the usual time, and, when greased, continues so much longer.

To enable others skilled in the art to make use of my said invention, I will proceed to describe the same.

Similar letters of reference where they occur denote like parts in all the drawings.

Letter A represents one of the wheels, turning on axle B.

Letter C represents one of the ends of the axle, working in the journal.

Letter D represents the conical-shaped cavity or bore, as shown in fig. 2.

Letter E represents the aperture at the outer end of the hub, at which point the grease is applied.

*a* in fig. 1 represents the track on which the wheel runs, and

*b*, the rail or guard which keeps the wheel on the shaft or axle.

I am aware that a patent was issued to David Cumming, of Pennsylvania, July 27, 1858, for a conical-shaped cavity or tapering hole in a box, when the said axle and box are arranged relatively to each other. This I do not claim, because his patent only relates to revolving axles, the box being stationary. My device relates only to hubs and wheels turning upon an axle; the conical-shaped bore within the hub being used only as an automatic greaser, thus supplying grease only when necessary, the cavity thus retaining and carrying the grease, the end of the axle having a plane surface, and not fitting the cavity, as in Cumming's patent.

Having thus fully described my invention,

What I claim as new, and desire to secure by Letters Patent, is—

A conical bore, shaped in such a manner as to carry and supply grease in a hard or liquid state, inserted in the outer center of wheels in tread-power machines, as herein described.

STEPHEN D. ELY.

Witnesses:
WILLIAM GREEN,
PETER M. KAFER.